United States Patent

Yamasaki et al.

Patent Number: 5,287,486
Date of Patent: Feb. 15, 1994

[54] DMA CONTROLLER USING A PROGRAMMABLE TIMER, A TRANSFER COUNTER AND AN OR LOGIC GATE TO CONTROL DATA TRANSFER INTERRUPTS

[75] Inventors: Takashi Yamasaki; Sachie Kuroda, both of Itami, Japan

[73] Assignee: Mitsubishi Denki Kabushiki Kaisha, Tokyo, Japan

[21] Appl. No.: 65,511

[22] Filed: May 20, 1993

Related U.S. Application Data

[63] Continuation of Ser. No. 592,098, Oct. 3, 1990, abandoned.

[30] Foreign Application Priority Data

Oct. 5, 1989 [JP] Japan .................. 1-260637

[51] Int. Cl.$^5$ ............... G06F 12/00; G06F 13/00
[52] U.S. Cl. ............... 395/425; 364/DIG. 1; 364/240.5; 364/242.3; 364/242.31
[58] Field of Search ............. 395/400, 425; 364/200 MS File, 900 MS File

[56] References Cited

U.S. PATENT DOCUMENTS

| | | | |
|---|---|---|---|
| 4,648,029 | 3/1987 | Cooper et al. | 395/325 |
| 4,716,523 | 12/1987 | Burrus, Jr. et al. | 395/425 |
| 4,751,634 | 6/1988 | Burrus, Jr. et al. | 395/275 |
| 4,989,113 | 1/1991 | Hull, Jr. et al. | 364/DIG. 1 |
| 5,018,136 | 5/1991 | Gollub | 370/60.1 |
| 5,099,417 | 3/1992 | Magar et al. | 395/425 |

FOREIGN PATENT DOCUMENTS 0421627 9/1990 European Pat. Off. ...... G06F 13/28

OTHER PUBLICATIONS

"DMA Controller Matches Fast CPUs to Slow Peripherals," Electronic Design, Jul. 27, 1989.
"SCSI-Interface-Bausteine Erhohen Datentransfer-Rate", Andrew M. Davidson, National Semiconductor, Design & Elektronik, Jul. 25, 1989.

Primary Examiner—Alyssa H. Bowler
Assistant Examiner—Frank J. Asta
Attorney, Agent, or Firm—Townsend and Townsend Khourie and Crew

[57] ABSTRACT

A DMA controller interrupts data transfer as needed to transfer the bus use permit to the CPU and resumes data transfer when the CPU completes the memory use in the burst mode in which the predetermined number of words is transferred between the I/O device and the memory.

1 Claim, 4 Drawing Sheets

DMA CONTROLLER USING A PROGRAMMABLE TIMER, A TRANSFER COUNTER AND AN OR LOGIC GATE TO CONTROL DATA TRANSFER INTERRUPTS

This is a continuation of application Ser. No. 07/592,098, filed Oct. 3, 1990, now abandoned.

BACKGROUND OF THE INVENTION

1. Field of the Invention

The present invention relates to direct memory access (DMA) controllers for directly transferring data between memory and input/output (I/O) devices without using any central processing unit (CPU) in an information processor.

2. Description of the Prior Art

In general, it is a waste of time to output data to an I/O device from memory by means of a CPU. One of the fast ways to output data to an I/O device from memory is to directly output data to an I/O device from the data bus. Such DMA requires some hardware, which is called "DMA controller," for supplying addresses and control signals for transferring data to read or write in the memory or I/O device. Like the CPU, the DMA controller generates addresses to read or write in the memory and sends various control signals to the I/O device.

FIG. 3 shows a conventional DMA controller 17 for an information processor which includes an information processing unit 1 such as a CPU of an electronic computer; a random access memory (RAM) 2; a 4-channel address output device 3; four I/O devices 12; a bus access controller 11; and data, address, and control buses 4, 5, and 6 for interconnecting the CPU 1, the address output device 3 the RAM, and the I/O device 12. The RAM 2 is a dynamic RAM which requires periodic refreshing. Four channels are assigned to the I/O devices 12 corresponding to the channels 0-3 of the address output device 3. The DMA controller 17 includes a transfer counter 9 and a request signal generator 10. The request signal generator 10 is composed of flip-flops such as bistable multivibrators. The transfer counter 9 moves one count up every time the transfer of data of one byte, for example, is completed and generates a carry at 255 counts. This is represented by a DMA end signal e.

The operation will be described with reference to FIG. 4. First of all, one of the I/O devices generates a DMA request signal $\overline{DRQ}$ (No. 1) for data transfer with the RAM 2. This is a negative logic signal and is represented by $\overline{DRQ}$. When the DMA request signal $\overline{DRQ}$ is applied to the request signal generator 10, the request signal generator 10 becomes H and stable there and outputs a bus request signal BRQ to the bus access controller 11. If there is neither DRAM refresh request r with high interrupt priority nor external HOLD request, the bus access controller 11 sends bus available signals BAK-A and BAK-B to the DMA controller 17 and the CPU 1, respectively. The CPU 1 then cuts off the data bus 4, the address bus 5, and the control bus 6 to stop the use of data from the RAM 2 The DMA controller 17, on the other hand, outputs to the address output device 3 an acknowledge signal $\overline{DAK}$ indicating that the buses 4-6 are available. The requesting I/O device 12 identified by the address output device 3 then enters a burst mode for a certain period in which 255 bytes of data are transferred directly to the RAM 2.

When a refresh request r is inputted during the DMA transfer, the DMA controller 17 stops while the address output device 3 releases the buses 4, 5, and 6 for refreshing and resumes DMA transfer when the memory refresh is completed When the transfer of 255 bytes of data is completed, the transfer counter 9 generates a DMA end signal e. This inverts the output BRQ of the request signal generator 10, and the bus access controller 11 cancels the bus available signal BAK-A. The DMA controller 17 then inhibits the acknowledge signal $\overline{DAK}$ so that the I/O device 12 is cut off from the buses 4, 5, and 6, which in turn are connected to the CPU 1.

If another I/O device 12 generates a similar request on the channel No. 0, the same operation as described above will be repeated Any request on the channel No. 0 during DMA transfer on the channel No. 1 is unacceptable and must wait until the transfer on the channel No. 1 is completed.

In the conventional DMA controller, however, the CPU 1 is unable to use the RAM 2 for a certain fixed period during the transfer of data in the burst mode. The CPU 1 performs an internal process during the DMA transfer and must wait for that time period even if it needs data from the RAM 2, resulting in the under utilization of the CPU 1.

SUMMARY OF THE INVENTION

Accordingly, it is an object of the invention to provide a DMA controller enabling the CPU to access the RAM even during DMA transfer, thereby enhancing the CPU processing efficiency.

In accordance with the invention there is provided a DMA controller for an information processor having a central processing unit; a random access memory; a plurality of input/output devices; and a plurality of buses for interconnecting the central processing unit, the random access memory, and the input/output devices. The direct memory access controller is operable in a burst mode in which the central processing unit is cut off from the buses while one of the input/output devices is connected to the buses for a predetermined period and includes a programmable timer circuit; and a unit for receiving a signal from the timer circuit or external program to cut off the input/output device from the buses while connecting the central processing unit to the buses in the burst mode and connect the input/output device to the buses while cutting off the central processing unit from the buses after a predetermined time period in response to the central processing unit or the external program to continue the burst mode.

In response to a DMA request from one of the I/O devices, the memory and the I/O device are connected via buses to perform data transfer in the burst mode. When a time up signal is outputted from the programmed timer circuit or external program during the burst mode, the CPU is connected to the buses while the I/O device is cut off from the buses. This enables the CPU to execute data within the memory. Then, the I/O device is connected to the buses after a predetermined period, in response to a signal from the timer circuit or external program to resume interrupted data transfer in the burst mode. Thus, the processing capability of the CPU is fully utilized even in the burst mode.

DESCRIPTION OF THE PREFERRED EMBODIMENT

Figure 1:
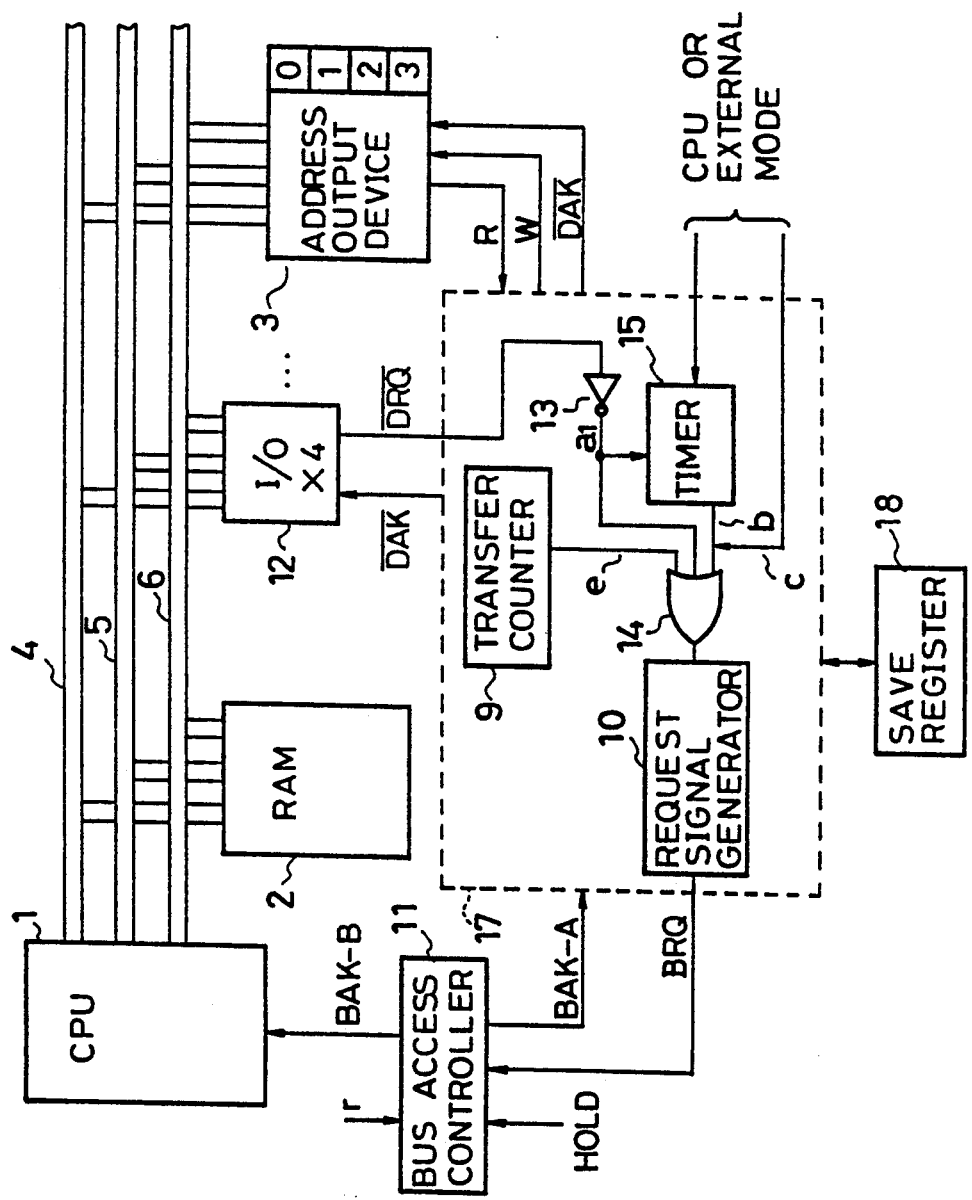
FIG. 1 is a block diagram of an information processor employing a DMA controller according to an embodiment of the invention.

FIG. 1 shows an information processor having a DMA controller 17 according to an embodiment of the invention. The information processor includes an information processing unit 1 such as a CPU of an electronic computer; a random access memory (RAM) 2; an address output device 3; a bus access controller 11; four I/O devices 12; a save register 18; and data, address, and control buses 4, 5, and 6 for interconnecting the CPU 1, the address output device 3, the RAM 2, and the I/O device 12. The I/O devices 12 are controlled by respective channels 0-3 of the address output device 3. The RAM 2 is a dynamic RAM which requires periodic refreshing.

The DMA controller 17 includes a transfer counter 9 and a request signal generator 10. The request signal generator 10 is composed of flip-flops such as bistable multivibrators. The transfer counter 9 has a counter which moves one count up every time the transfer of data of one byte, for example, is completed and generates a carry at 255 counts. This is represented by a DMA end signal e. The DMA controller 17 further includes a programmable timer circuit 15, a receiving circuit or OR gate 14, and an inverter 13. External software is used to set a given time of the timer circuit 15. The OR gate 14 receives the DMA end signal e from the transfer counter 9, respective DMA request signals DRQs ($a_1$, $a_2$, ...) from the I/O devices 12, a time up signal b from the timer circuit 15, and a resume signal c.

Figure 2:
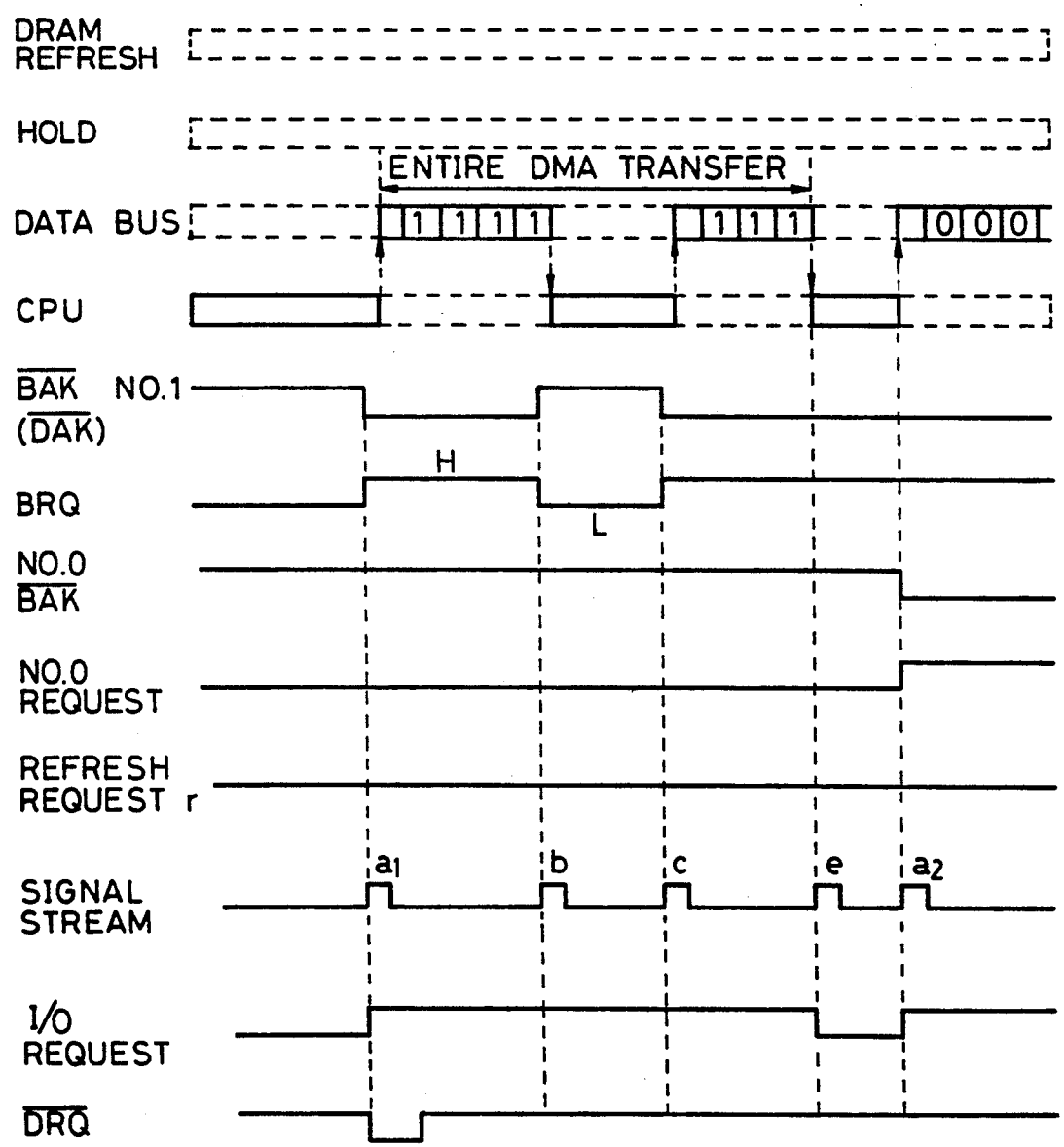
FIG. 2 is a timing chart useful for explaining the operation of the DMA controller of FIG. 1.
Figure 3:
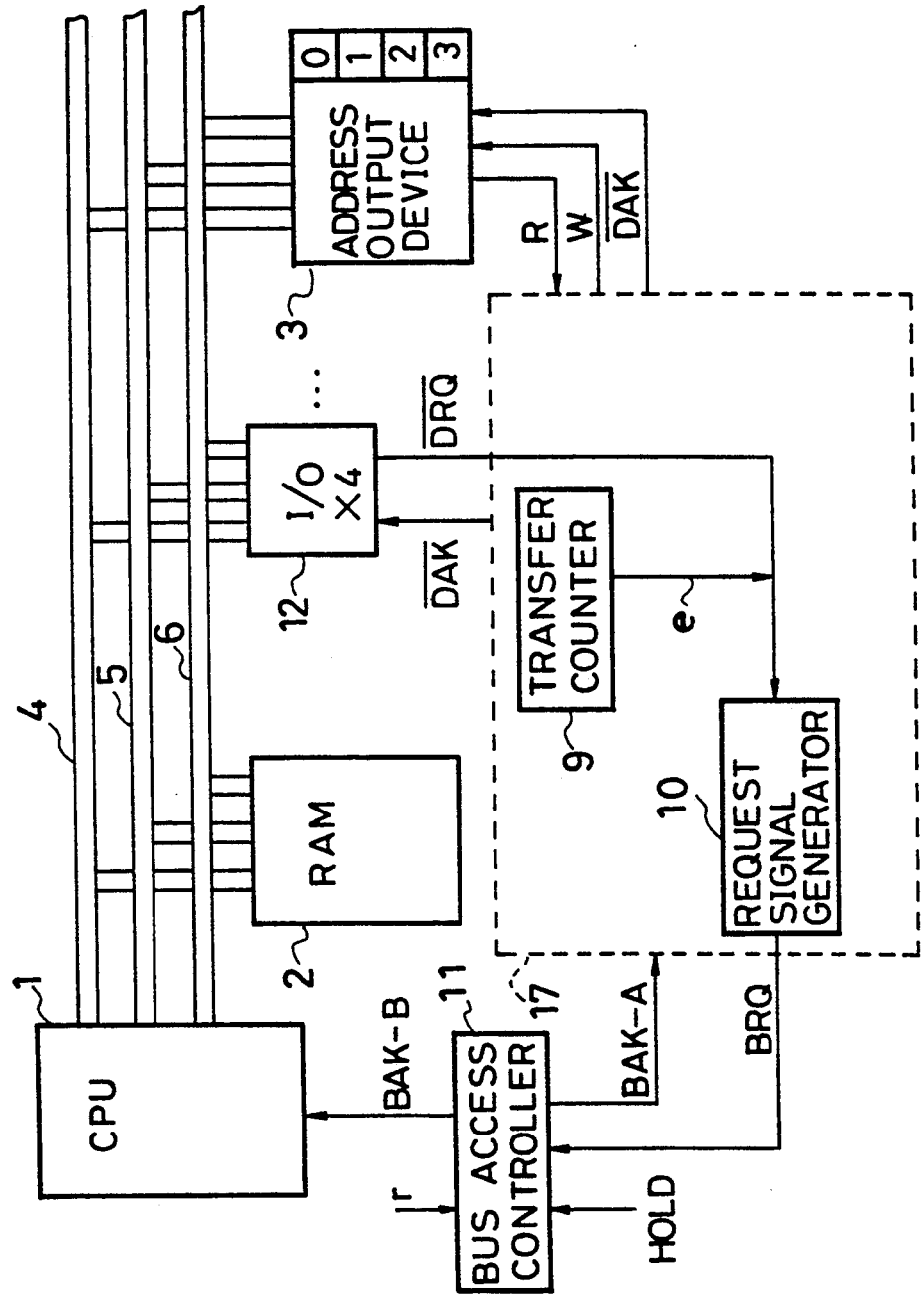
FIG. 3 is a block diagram of an information processor employing DMA controller.
Figure 4:
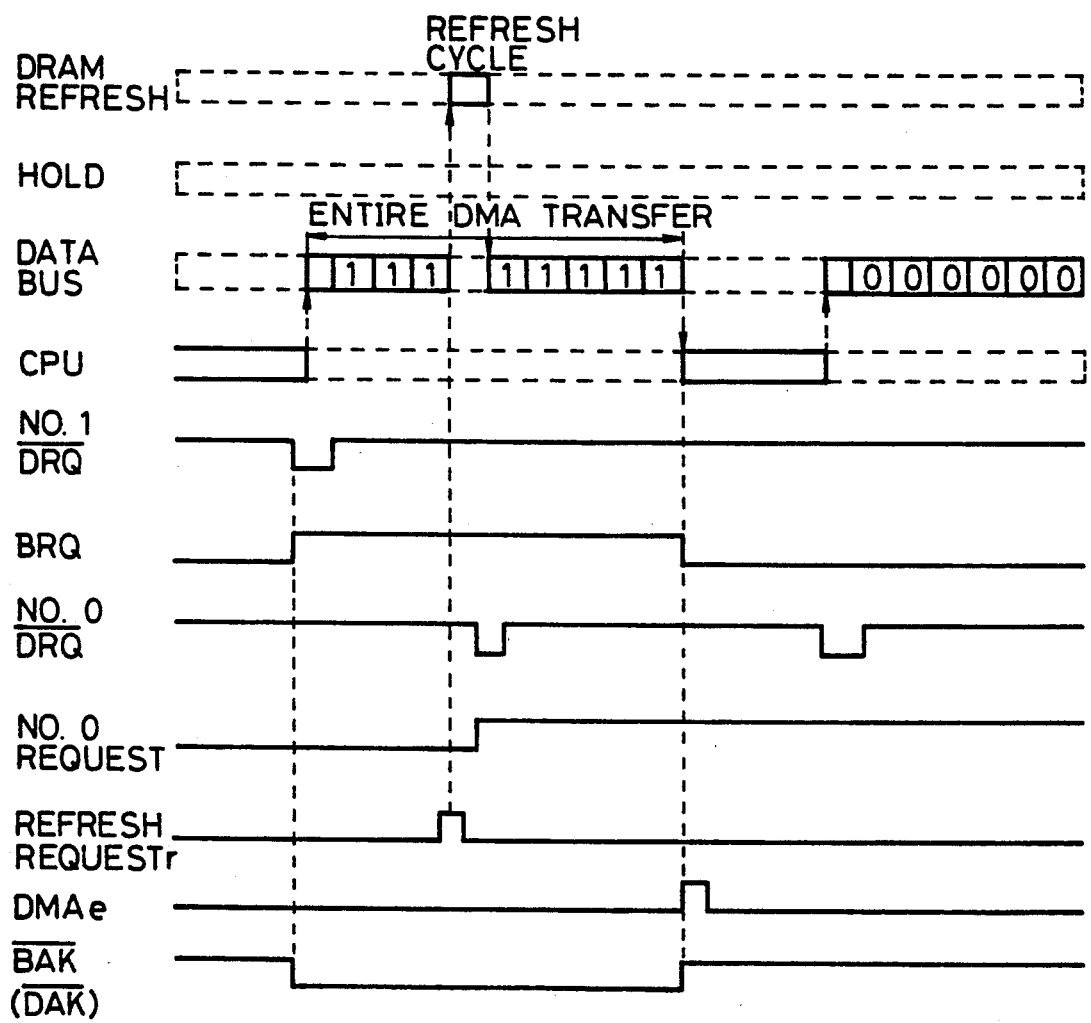
FIG. 4 is a timing chart useful for explaining the operation of the conventional DMA controller of FIG. 3.

The operation of the DMA controller will be described with respect to FIG. 2. First of all, a DMA request signal $\overline{DRQ}$ (No. 1) is outputted by one of the I/O devices 12 for requesting a DMA transfer. This DMA request signal $\overline{DRQ}$ is inverted by the inverter 13 and outputted from the OR gate 14 as the leading signal $a_1$ of a signal stream. When the request signal $a_1$ is applied to the request signal generator 10, the request signal BRQ becomes H and stable there due to the bistable multivibrator, outputting a bus request signal BRQ. Simultaneously, the signal $a_1$ starts the timer circuit 15. If there is neither DRAM refresh request r with high interrupt priority nor external HOLD request, the bus access controller 11 sends bus available signals BAK-A and BAK-B to the DMA controller 17 and the CPU 1, respectively. The CPU 1 cuts off the data, address, and control buses 4-6 to stop the use of data from the RAM 2. This enables the DMA controller 17 to output to the address output device 3 an acknowledge signal DAK indicating that the buses 4-6 are available. The I/O device 12 of the channel designated by the address output device 3 starts direct transfer of data with the RAM 2.

The timer circuit 15 times up to output a signal b after a predetermined time in a burst mode where the I/O device 3 transfer data with the RAM 2. When the signal b is applied to the request signal generator 10 via the OR circuit 14, the request signal generator 10 changes from H to L and stays there so that the bus request signal BRQ becomes L and disappears. Consequently, the CPU 1 is connected to the buses 4, 5, and 6 to read or write data in the RAM 2. Simultaneously, the bus access controller 11 cancels the bus available signal BAK-A to the DMA controller 17, which in turn cancels the acknowledge signal $\overline{DAK}$ to the address output device 3. In this way, the data transfer between the I/O device and the RAM 2 is interrupted, and the address in the RAM 2 is saved in the register 18 by the DMA controller 17.

A resume signal c applied from the outside after a predetermined time triggers the request signal generator 10 via the OR circuit 14. Consequently, the request signal BAK becomes H so that the buses 4-6 are cut off from the CPU 1 and connected to the address output device 3. As a result, data transfer is resumed between the RAM 2 and the I/O device 12 from the address saved in the register 18. When the transfer of 255 bytes of data is completed, in the burst mode, the transfer counter 9 outputs a DMA end signal e. This inverts the output BRQ of the request signal generator 10 into L while the bus access controller 11 cancels the bus available signal BAK-A so that the acknowledge signal DAK is inhibited. Consequently, the I/O device 12 is cut off from the buses 4-6, which in turn is connected to the CPU 1. After a while, if another I/O device 12 (No. 0) generates a similar request $a_2$ on the channel No. 0, the above operation is repeated.

The burst mode interrupt signal b and resume signal c may be of the internal mode set by only the timer circuit 15 or of the external mode in which it is inputted from the outside according to a program. If the set time of the timer circuit 15 is made longer than the burst mode period in which 255 bytes are transferred, the mode is no more than the conventional burst mode in which the DMA controller is able to monopolize the buses 4-6 (RAM 2) until a predetermined quantity of data is transferred.

As has been described above, according to the invention, the I/O device is cut off from the buses in the burst mode by the timer circuit or external program while the CPU is connected to the buses and, after a predetermined time, the I/O device is connected to the buses while the CPU is cut off from the buses to continue the burst mode so that it is possible to carry out the CPU process as needed, thereby enhancing the information processing efficiency.

We claim:

1. In a direct memory access controller for an information processor having a central processing unit, a memory, input/output devices, and buses for alternately connecting said memory to said central processing unit and said input/output devices, said direct memory access controller being responsive to a DMA request signal from one of said input/output devices to disconnect said central processing unit from said buses and normally connect a requesting one of said input/output devices to said buses during a burst mode until a predetermined length of data has been transferred, the improvement comprising:

a programmable timer circuit having a first input for receiving a time-up value from said central processing unit, a second input for receiving a timer start signal in the form of a DMA request signal from one of said input/output devices, and an output for generating a time up signal;

a transfer counter circuit for monitoring the progress of a DMA transfer, said transfer counter circuit having an output for generating an end of transfer signal;

an OR circuit having a plurality of inputs for receiving said DMA request signal from one of said input/output devices, said time-up signal from said programmable timer circuit, a bus request signal from said central processing unit, and an external resume signal, and an output for generating a bus control signal;

a request signal generator having an input coupled to the output of said OR circuit and an output for generating a bus request signal; and a bus access controller coupled to the output of said request signal generator and responsive to said bus request signal for outputting a bus available signal to either said central processing unit or said input/output device, said request signal generator being responsive to successive output signals from said OR circuit to assert the bus request signal in response to the receipt by the OR circuit of the DMA request signal, to de-assert the bus request signal in response to the subsequent receipt by the OR circuit of the time-up signal, to re-assert the bus request signal in response to the receipt by the OR circuit of the external resume signal, and to de-assert the bus request signal in response to the receipt by the OR circuit of the end of transfer signal.

* * * * *